March 12, 1957
A. M. PEIFFER ET AL
2,784,795
ELECTRONIC SAFETY APPLIANCES FOR VEHICLES
AND ROAD AND RAILWAY INTERSECTIONS
Filed July 25, 1951
4 Sheets-Sheet 1
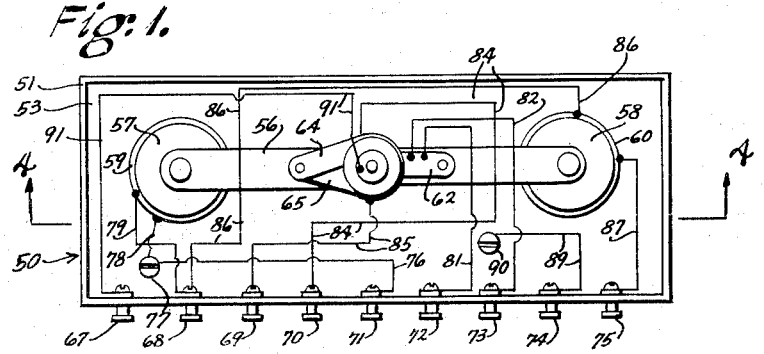
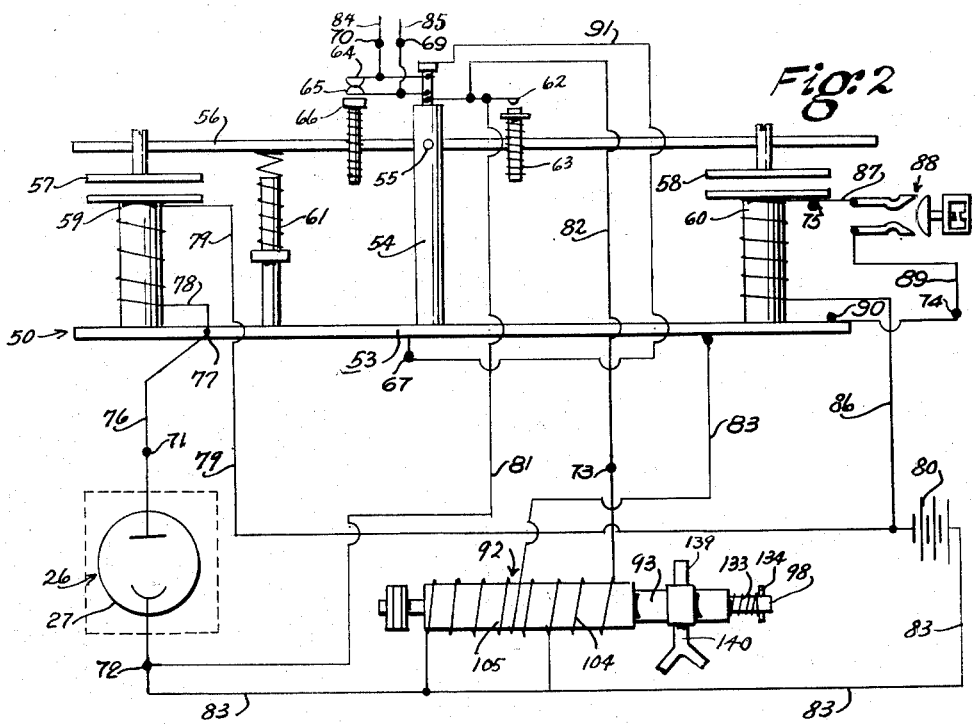
INVENTORS
Alfred M. Peiffer
Harold C. Roeder
BY Oscar Funk
W. W. Williamson
ATTORNEY

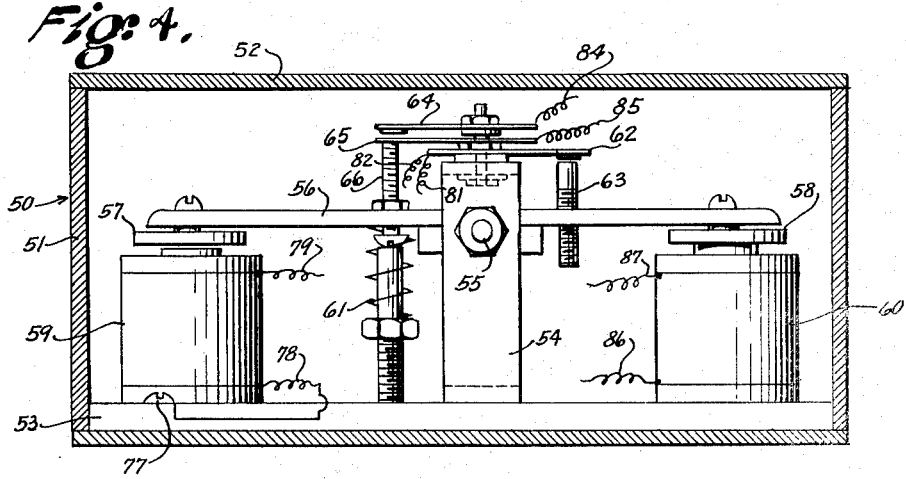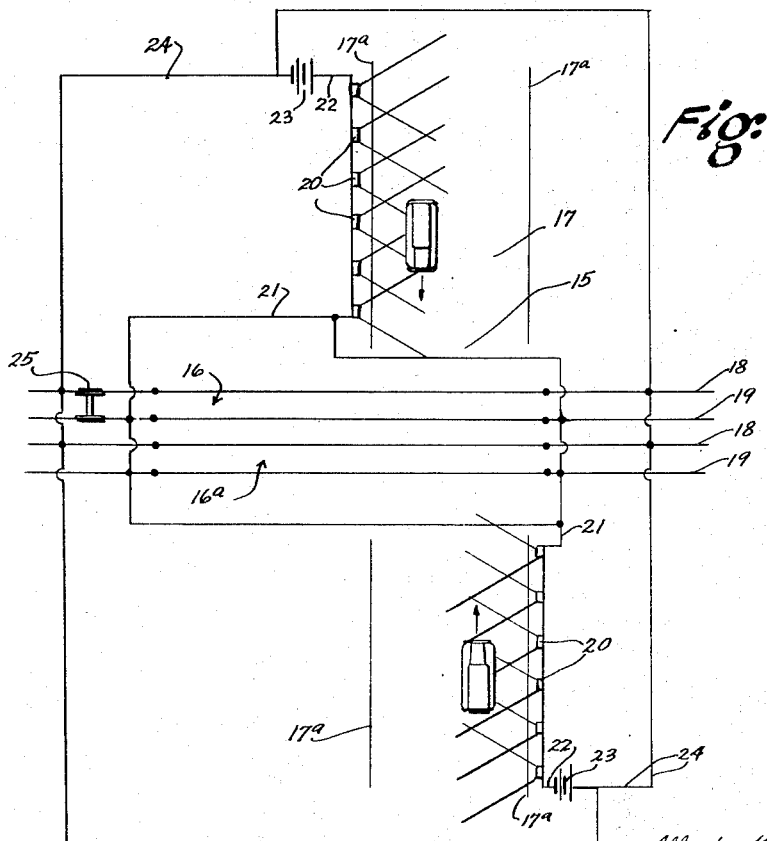

United States Patent Office 2,784,795
Patented Mar. 12, 1957

2,784,795

ELECTRONIC SAFETY APPLIANCES FOR VEHICLES AND ROAD AND RAILWAY INTERSECTIONS

Alfred M. Peiffer, Schuylkill Haven, Harold C. Roeder, Summit Station, and Oscar Funk, Pine Grove, Pa.

Application July 25, 1951, Serial No. 238,548

1 Claim. (Cl. 180—82)

Our invention relates to new and useful electronic safety appliances for vehicles and road and railway intersections to be employed in connection with railway or other crossings, signals, such as railway and road or street traffic control systems, and safety zones or locations on roads, railway systems or any course along which motor vehicles may travel, in order to automatically set the brakes of a vehicle at predetermined places for stopping such vehicle for any desired reason, particularly when danger of an accident is imminent.

One of the objects of the present invention is to provide a vehicle stopping system of relatively simple and durable construction and comprising certain electrical equipment on the vehicle to cause an actuation of combined electrical and mechanical equipment on said vehicle whereby an application of its brakes will be made to bring the vehicle to a standstill.

Another object of this invention is to provide a vehicle with mechanical and electrical equipment, the former including the brakes and component parts and the latter including the ignition system, to be acted upon by means adjacent the vehicle and in its path of travel to cause the equipment to function in a manner that will open the circuit of the ignition system and set the brakes.

Another object of the invention is to mount a vacuum tank on a vehicle in communication with cylinders having pistons connected by appropriate means with suitable portions of the brake and clutch mechanisms, or equivalent apparatus, and to assemble a valve in the conduit, which may be actuated manually, electrically or otherwise, for opening the communication between the tank and cylinder to cause an application of the brakes.

Another object of this invention is to provide a novel detector including a photo-electric cell to be influenced by light rays from a source of light positioned at suitable locations for initiating the functions of the vehicle controlling mechanism to reduce the speed of such vehicle and finally cause it to stop when and if a dangerous condition exists in the path of travel of the vehicle.

A further object of the present invention is to equip vehicles with the control mechanism, detector apparatus and source of light whereby one vehicle approaching a stalled one will be stopped or two vehicles approaching each other from opposite directions along the same path of travel both will be brought to a standstill in sufficient time to prevent disaster.

A still further object of this invention is to check the speed of a vehicle, or a train of vehicles, electronically by light rays, especially of a definite and particular type, situated at various locations to regulate the travel of said vehicle or train of vehicles.

With the above and other objects in view this invention consists of the details of construction and combination of elements hereinafter set forth and then designated by the claim.

In order that those skilled in the art to which this invention appertains may understand how to make and use the same we will describe its construction in detail, referring to the accompanying drawings, forming a part hereof, in which:

Fig. 1 is a top plan view of the control mechanism and the electrical apparatus thereof, in a casing from which the cover is removed.

Fig. 2 is a diagrammatic view of the several intercommunicating electric circuits included in the vehicle equipment and illustrating the relation between the photoelectric cell, the brake and power transmitting mechanisms, the ignition interrupter and the resetting switch.

Fig. 3 is a top plan view of two vehicles, one approaching the other or both approaching each other from opposite directions, showing how light rays from one or more sources can activate one or more photo-electric cells falling within the areas of the light rays.

Fig. 4 is an enlarged sectional elevation on the line 4—4 of Fig. 1.

Fig. 5 is a diagrammatic view of one type of intersection, illustrated as a railway crossing, and showing an installation to stop automotive vehicles short of the tracks during the approach of a railway vehicle or vehicles along the tracks.

Fig. 6 is a schematic view of the elements directly controlling the operation of the brakes and power transmission mechanism of a vehicle.

Fig. 7 is a longitudinal sectional view of the solenoid valve shown in the open position.

Fig. 8 is a similar view with the valve illustrated in a closed position.

Fig. 9 is an end view of the solenoid valve looking at the electrical switch.

Fig. 10 is a section on the line 10—10 of Fig. 8.

Fig. 11 is a section on the line 11—11 of Fig. 8.

Fig. 12 is a blown up perspective view of certain elements of the electric circuits at the outer end of the solenoids.

Figure 13:
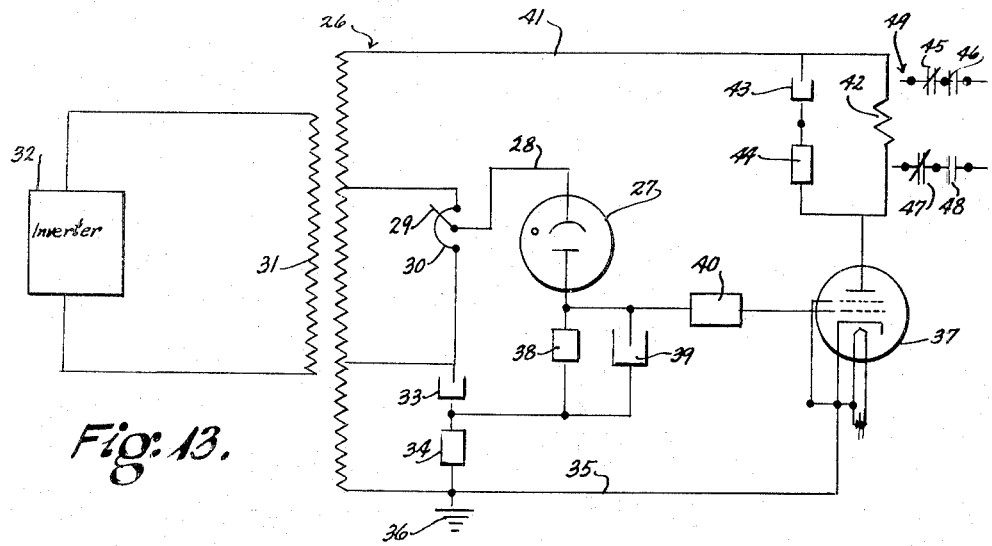
Fig. 13 is a diagrammatic view of the photo-electric cell detector unit and associated electric circuits.

In carrying out our invention as herein embodied 15 is an intersection of two traffic courses and, for purposes of illustration only, this intersection is shown as a railway crossing in which tracks 16 and 16a intersect a road 17 denoted by the lines 17a. Each track 16, 16a is shown as comprising two rails 18 and 19 properly electrically bonded and suitable portions insulated to provide blocks into which trains will enter to cause an operation of the roadway equipment. It is to be understood that the crossing may be one railway track or set of tracks or two roads. It should also be understood that the roadway equipment, to be presently described, may be located without regard to an intersection of courses of vehicular travel and located in any desirable position along a roadway, as adjacent a traffic signal or in a control zone, or at suitable intervals along a railway track.

Sources of light 20 re installed in any suitable locations in a vehicular course of travel to be energized by either A. C. or D. C. electric current of desirable voltage, Fig. 5. The sources of light must be situated so that a vehicle proceeding along the course of travel cannot escape the light rays from said light sources wherefore, for illustrative purposes only, we have shown the roadway 17 on both sides of and adjacent the crossing 15 as of the two lane type. Also for purposes of description only, the light sources are illustrated as being only in one lane of the roadway but it is understood that they can be situated in both lanes of approach relative to the crossing or in any other manner to accomplish the desired results and may be installed in the railway right of way when the apparatus is to be used for stopping trains or railway vehicles. Also said light sources can be arranged so that the light rays cover a larger area of a travel lane as it approaches the crossing and even extend into the opposite travel lane adjacent said crossing.

As illustrated herein, the light sources 20, such as lamps, are arranged in banks beside a path of travel and are included in a normally open electric circuit consisting of said lamps, conductors 21, between both banks of lamps and a rail 19 of each track in blocks at opposite sides of the crossing, other conductors 22 between the lamps and sources 23 of electric current and still other conductors 24 between the sources of electric current and the other rail 18 of each track. In the above described installation a railway vehicle, represented at 25 acts as an element of an electric switch to close the circuit but it is to be understood that we also contemplate the use of a manually operated switch or a time switch or other circuit closing means as the equivalent of that illustrated. Whenever the road circuit is closed, as by a railway vehicle entering a block electrically connected to the lamps the latter will be energized to influence a particular part of the vehicle equipment to be next described.

The vehicle equipment includes a detector unit 26 to be directly influenced by the light rays from the lamps 20 and is suitably mounted on a vehicle in any convenient manner and in an appropriate location to enter the field of light rays. While the light rays may be what is generally termed white it is highly advantageous that they be of some extraordinary distinctiveness, such as infra-red.

This detector unit 26, Fig. 13, includes the photo-electric cell 27, the emitter element of which is connected by a conductor 28 with the movable contact 29 of rheostat 30 which has both ends of its resistance in the same circuit with a portion of the secondary coil of a transformer 31 while the primary coil of said transformer is connected with an inverter 32 which changes the six volts direct current from, for example, a vehicle storage battery to one hundred ten volts alternating current which supplies the electric energy to said photo-electric cell. The circuit for the rheostat resistance is connected with one pole of an electrolytic detector 33 while the other pole of detector 33 is connected through a condenser 34 with a conductor 35 leading from one side of the secondary coil of the transformer 31 and also grounded at 36. The conductor 35 leads to one element of the thyratron tube 37.

The other element of the photo-electric cell 27 is connected with a condenser 38 and an electrolytic detector 39, in parallel, and to the connection between the first mentioned electrolytic detector 33 and condenser 34. Also, said other element of the photo-electric cell 27 is connected through a condenser 40 with another element of the tube 37.

A conductor 41 leads from the end of the secondary coil of the transformer 31 opposite to that end to which the conductor 35 is connected. Said conductor 41 leads to another element of the tube 37 through a coil 42, on one side of a parallel connection, and an electrolytic detector 43 and a condenser 44, in series with each other, on the opposite side of the parallel connection with relation to the coil 42. Associated with the coil 42 are the elements 45, 46, 47 and 48 of a relay 49 and the elements 45 and 47 are normally closed while the elements 46 and 48 are normally open.

The control mechanism 50, Figs. 1, 2 and 4, includes a suitable casing 51 of wood or other desirable dielectric material the top of which casing is closed by a cover 52. On the inner surface of the bottom of said casing is a copper base plate 53 to which is secured the lower end of an upright support 54 in electric conductive relation to said base plate. Adjacent the upper end of the support 54 is a pivot 55 for a horizontal lever 56 fulcrumed approximately midway its ends whereby the ends may reciprocate vertically and provided with armatures 57 and 58 at opposite ends thereof. The armatures 57 and 58 cooperate, respectively, with electro-magnets 59 and 60 mounted on the copper base plate 53 and the end of the lever with the armature 57 thereon is normally urged to an elevated position by the spring 61.

At the upper end of the upright support 54 is a spring arm contact 62 which projects over the end of the lever 56 that carries the armature 58 and said contact 62 is insulated from the support 54 and adapted to be engaged by an electric conductive contact member 63 in electric conductive relation to the lever 56 which, in turn, is in electric conductive relation to the upright support 54 as shown in Fig. 4.

Also mounted on the upper end of the support 54 as shown in Fig. 4, and insulated therefrom and from the contact 62, are a pair of companion spring arm contacts 64 and 65 which are insulated from each other but in vertically normally spaced cooperative relation. The underneath contact, as 65, is engaged by a contact member 66 on the end of the lever 56 carrying the armature 57 which end of the lever 56 is normally elevated by the action of the spring 61 wherefore said contact 65 is normally held in engagement with the contact 64 to generally maintain a closed circuit to be presently described.

On the front of the casing 51, so as to be accessible from the outside of said casing are a number of wire clamping terminals 67, 68, 69, 70, 71, 72, 73, 74 and 75, Fig. 1.

From one side of the detector unit 26 which is shown in Fig. 2, and which is also shown in Fig. 13, an element 46 is electrically connected with the terminal 71 as is shown in Fig. 1 and in Fig. 2, on the control mechanism casing and from the terminal 71 leads a conductor 76 to a connector 77, on the copper base plate 53, which is electrically connected by a conductor 78 with one side of the electro-magnet 59 and the other side of said electro-magnet 59 is connected by a conductor 79 with the control mechanism terminal 68 which is electrically connected to the minus side of the battery 80, Fig. 2.

In Fig. 2, the other side of the detector unit 26 is electrically connected with the control mechanism terminal 72 which, in turn, is connected by a conductor 81 with the spring contact 62 and the latter is also connected by a conductor 82 with the control mechanism terminal 73 that is electrically connected to the plus side of the battery 80. In Fig. 2, this portion of the electrical circuit includes the contact member 63, lever 56, upright support 54, base plate 53, connection 77 to the detector which, when the circuit therethrough is closed, is electrically connected, as by a conductor 83 to the plus side of the battery 80.

The spring contact 64 is connected by a conductor 84 with the control mechanism terminal 70 that is electrically connected to one side of the motor vehicle ignition circuit and its companion spring contact 65 is connected by a conductor 85 with the control mechanism terminal 69 which, in turn, is electrically connected to the opposite side of the vehicle ignition circuit which is normally maintained in a closed condition.

From one side of the resetting electro-magnet 60, conductor 86 leads to the control mechanism terminal 68 which is electrically connected with the minus side of the battery 80. The other side of the electro-magnet 60 is connected by a conductor 87 to the control mechanism terminal 75 which, in turn, is electrically connected to one side of a normally open resetting switch 88, Fig. 2, and the opposite side of said switch 88 is electrically connected with the control mechanism terminal 74 that is connected by a conductor 89 with the plus side of the battery 80 through the fastening 90, Fig. 1, base plate 53, upright support 54, contact member 63, contact 62 and conductor 82 to the control mechanism 73 that is connected to the plus side of the battery 80.

As illustrated in Figs. 1 and 2, a conductor 91 leads from the control mechanism terminal 67 to the upright support 54 which completes a circuit for a solenoid valve 92 electrically connected to the control mechanism terminals 67 and 68.

The solenoid valve 92 includes a casing 93, Figs. 7 and 8, having a bore 94 extending lengthwise entirely therethrough and ports 95 and 96 forming an inlet and an outlet and further provided with a hole 97 functioning as an air inlet or refilling opening. In the bore of the casing 93 is slidably mounted a plunger 98 which has a passageway 99 to open a communication between the ports 95 and 96 when the plunger is projected. Said plunger also has a bypass groove or channel 100 to provide a communication between the port 95 and the hole 97 when the plunger is retracted or returned to its normal at rest position. Suitable means is employed to prevent rotation of the plunger and illustrative thereof a screw 101 is shown mounted in the casing and projecting into a spline groove 102 in the plunger.

Projecting from the inner end of the valve casing 93 is a tubular extension member 102, here shown as an iron pipe, and this extension member may be inserted in the bore of the casing and spaced from the plunger to permit oscillation of the latter. About the valve casing and its extension member are two solenoid coils or sets of windings 104 and 105, the former being the operating coil and the latter the holding coil. The coils may have a separator 106 between their adjacent ends and the outsides covered by a jacket 107.

At the outer end of the outer or holding coil 105 is a fibre washer or sheet 108 with a central hole 109 and on the outside of said fibre washer are mounted two plates 110 and 111 which are laterally spaced apart or electrically insulated, as by an air gap, and said plates also have an opening 112 between them, Fig. 12. To the plates 110 and 111 are attached a pair of parallel posts 113 and 114 so that the post 113 is electrically connected to plate 111 and post 114 is electrically connected to plate 110. On the other ends of said posts is mounted a fibre sheet or washer 115 having a hole 116 and on the inner face of said fibre sheet are fixed a pair of plates 117 and 118 spaced from the posts and spaced apart laterally thus being insulated by an air gap and said plates have an opening 119 between them. The hole 109 and openings 112, 119 and 116 are in alignment.

A circuit breaker in the form of a spring finger 120 is attached to the outer end of one post, as 113, and is urged towards the other post, as 114, which it normally contacts. The valve plunger 98 carries a rod 121 of insulating material or it is otherwise insulated from adjacent metallic parts and this rod has a reduced neck 122 at its outer end with a shoulder 123 at the inner end of the neck and a head 124 at the outer end of said neck. On the neck is a metal washer or switch member 125 slidable between the shoulder 123 and the head 124 so as to engage either pair of plates 110 and 111 or 117 and 118. The metal washer or switch member 125 is temporarily held against the plates 110 and 111 by the head 124 and similarly held against the plates 117 and 118 by the shoulder 123.

In actual practice the posts 113 and 114 with the plates 110, 111, 117 and 118 form portions of the electrical circuits of the solenoid valve coils but for convenience of illustration said electric circuits are shown diagrammatically in which lines 126 and 127 connect the conductor 82 with the respective coils 104 and 105; a line 128 connects coil 104 with the contact of the circuit breaker or post 114; a line 129 connects coil 105 with plate 118; and lines 130 and 131 connect the post 113 and plate 117 respectively with the conductor 83. With the valve parts in the positions shown in Fig. 8 should the coil energizing electric circuit be closed the electric current will first flow through coil 104 over lines 126 and 128, the spring finger 120 and the line 130 thus energizing said coil 104 which will project the plunger 98. At a predetermined point in the movement of the plunger the shoulder 123 will pick up the switch member 125 and move the latter towards the plates 117 and 118 causing said switch member to bridge said plates 117 and 118 and practically simultaneously therewith the rod 121 engages the spring finger 120 and therefore opens the circuit through coil 104 and closes the circuit through coil 105 as shown in Fig. 7. In this condition the electric current will flow through line 127, coil 105, line 129, plate 118, switch member 125, plate 117 and line 131 thus energizing coil 105 and deenergizing coil 104. This will hold the plunger 98 retracted until said coil 105 is deenergized. At such time the plunger will be projected by springs 132 and 133, one concentric with the other, having one end of both resting against an end of the valve casing and the other end of both engaging means 134, such as a cotter pin, on the plunger. Two springs are used to obtain the necessary strength with considerable flexibility. The plunger 98 may be retracted manually through the use of a pull cord 135, Fig. 6, suitably attached to said plunger and located within access of an authorized operator. This is particularly advantageous on railways and if the solenoid coils are eliminated the device is especially useful on vehicle trailers and similar conveyances.

In the assembly on the vehicle there is included a vacuum tank 136 having an outlet 137 connected with an air exhausting means (not shown) such as the carburetor or suction side of an explosive engine said outlet having a check valve 138 therein. The tank also has an inlet 139 connected with the port 96 of the solenoid valve. The port 95 of the solenoid valve is connected, as by a branch conduit 140 with the interior of separate or individual cylinders 141 and 141a between their respective closed ends and the space within which the pistons 142 and 142a operate so that when the passageway 99 in the plunger aligns with the ports 95 and 96 the rush of air from the cylinders 141 and 141a to the vacuum tank 136 will pull the pistons 142 and 142a backward.

A connecting means 143, preferably in the form of a rod, is attached to each separate piston 142, 142a and connected, respectively, with the brake system and power system of the vehicle which brake system and power system are represented by the brake pedal 144 and clutch pedal 144a, respectively. The union between the connecting means and the brake system and power system is a loose connection so that they may be operated independently of the automatic vehicle stopping device and for this purpose each connecting rod 143 is shown with a slot 145 for registration with a pin 146 on a suitable part of the respective pedals. When the plunger 98 of the solenoid valve is returned to its normal or closed position, as in Figs. 6 and 8, the by-pass 100 will form a communication between the opening 97 and the port 95 and permit air from the surrounding atmosphere to pass into the cylinders 141 and 141a so the pistons can be retracted in any well known manner.

Figure 14:
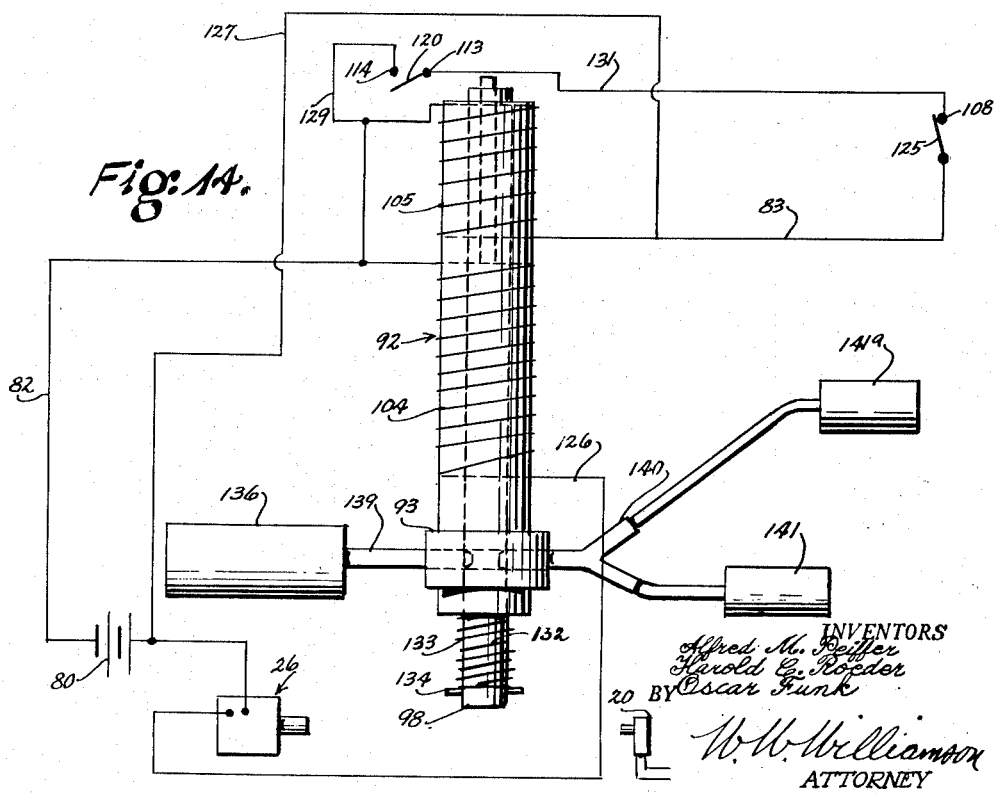
Fig. 14 is a similar view of the main circuits with relation to the photo-electric cell detector unit, a source of light and the solenoid valve and companion elements.

As particularly disclosed in Figs. 3 and 14, a power and brake control mechanism as well as a detector unit or units and one or more sources of light, suitably arranged to project rays towards an approaching vehicle, can be installed upon each vehicle, especially those used on interurban trains or high speed trolleys. By such employment of the apparatus whenever two vehicles or trains approach each other on the same track the appliance will operate to shut off the power and cause an application of the brakes to stop both vehicles or trains, if both are running, or accomplish the same result relative to the moving vehicle if only one is running.

The operation of the apparatus is as follows:

The parts being at rest, upon closing the ignition switch, ordinarily key operated, for starting the vehicle motor, said motor may be started as usual or other type of power placed in operative condition.

When the lamps 20 are energized in any manner, for example, as when a train enters a safety block, and upon the entrance of a properly equipped vehicle into the area of light rays emanating from said lamps 20 the detector unit 26 will influence the relay mechanism 49 and thereby complete a circuit from one side of the source of electricity 80, Fig. 2, through conductor 83, the closed elements of said relay mechanism 49, Fig. 13, of said detector unit, conductor 76, the electro-magnet 59 and conductor 79 back to the source of electricity 80. This will cause the end of the lever 56 carrying the armature 57 to be attracted by the electro-magnet 59 and open the ignition circuit between the contacts 64 and 65 causing the vehicle motor to stop or shutting off any other type of power.

The depression of the aforesaid end of the lever 56 to open the ignition circuit will raise the opposite end thereof and cause the contact member 63 to engage the contact 62 thereby closing a circuit from one side of the source 80 of electricity through the conductor 83 to the switch elements 113 and 114 of the solenoid coils 104 and 105 or, in effect, to one side of each of said solenoid coils and from the other side of said solenoid coils, through conductor 82, contact 62, contact member 63, lever 56, support 54, base plate 53, conductor 78, electromagnet 59, and conductor 79 to the other side of the source 80 of electricity. The closing of the last mentioned circuit will energize the solenoid coil 104 and pull the plunger 98 inward after which said coil 104 will be de-energized and the solenoid coil 105 energized as previously described.

The inward movement of the plunger will open communication between the vacuum tank 136 and the cylinders 141, 141a and cause the pistons 142, 142a to move inwardly and apply the vehicle brakes and disconnect or shut off the power which will bring the vehicle to a standstill.

As the last previously described circuit is maintained, regardless of whether the lights are subsequently extinguished, the ignition circuit will continue in open condition, the power shut off and the brakes will remain applied, but if the train has proceeded beyond the safety block the apparatus may be returned to the neutral or inoperative condition by manipulation of the resetting switch 88.

Upon manually operating the resetting switch 88 to temporarily close the same, a circuit is completed from one side of the source of electricity 80 through conductor 89, said switch 88, conductor 87, electro-magnet 60 and conductor 86 to the other side of source of electricity 80. The closing of this circuit will energize the electro-magnet 60 and move the switch lever 56 in a reverse direction or to an inoperative or open position, thereby opening the circuit through the electro-magnet 59, thereby opening the circuits through the solenoid valve coils and closing the ignition circuit. Upon releasing the resetting switch 88 the circuit controlled thereby will be opened and the electro-magnet 60 will be deenergized but the lever 56 and component and associated parts will remain in the neutral or inoperative position due to the action of the spring 61 so that the then closed circuit will be held closed and the open circuits will remain open.

From the above it will be apparent that upon the lamps 20 being extinguished, along the roadway, the automatic control or stop mechanism carried by the vehicle may be readily reset by actuation of the manual resetting switch 88 but so long as the vehicle is in the area of light rays from the lamps 20, said mechanism cannot be reset to close the circuit of the ignition system, release the brakes or connect the power since the primary or initial circuit through the detector will be maintained due to the influence of said light rays from the lamps 20 on the photoelectric cell of the detector unit.

As the pistons 142, 142a and connecting means 143 are to be applied to any suitable part of a brake system and a power system, respectively, the apparatus herein described may be attached to mechanical, air pressure, vacuum, steam, electric or other forms of brakes and power transmission means by merely making the proper connections.

Where the solenoid valve is provided with a pull cord should certain of the electric circuits become disrupted said pull cord could be drawn upon by any person, even one other than the operator of the vehicle. This arrangement is particularly advantageous on trains or tractor vehicles. The pull cord can be also used where the solenoid coils are not used, as in trailing vehicles so that when the apparatus on the tractor vehicle is automatically actuated the brakes on a trailing vehicle can be operated by drawing on the pull cord. In fact the pull cord on the valve of the trailer could be attached to the plunger of the valve on the tractor so that operation of the automatic appliance will actuate the semi-automatic appliance on the trailer.

We do not wish to be limited to the exact details of construction herein shown and described as these may be varied within the scope of the appended claim without departing from the spirit of our invention.

Having thus described our invention what we claim as new and useful is:

In a vehicle having supporting wheels, an electrical ignition circuit with a source of electrical power therefor, power means for transmitting motion to said wheels, braking means for retarding motion of said wheels, and a brake control mechanism comprising a cylinder, a piston in said cylinder, means connected to and directly actuated by said piston to set said braking means on inward movement on said piston in said cylinder, that improvement comprising a vacuum tank connected to said cylinder, a solenoid valve operative to control the passage of air therebetween for movement of said piston, a holding circuit, a first coil on said solenoid valve which is connected in series to said holding circuit, said holding circuit including a switch and a mounting therefor, a lever fulcrumed between its ends having spring biasing means between said lever and said mounting to normally press said lever away from electrical contact with said switch in said holding circuit, a second coil on said solenoid valve energized by the source of power for said ignition circuit, wave energy receiving means connected in series with said second coil to energize said second coil and said switch in the holding circuit and which is operatively connected to close said holding circuit and open said ignition circuit, a resetting circuit connected in series between said source of power and said holding circuit, said resetting circuit including electromagnetic means and a manually resettable switch in series therewith whereby the closing of said manual switch energizes said resetting circuit, de-energizes said holding circuit, permits said lever to be spring pressed against said switch in the holding circuit, and said ignition circuit and permits the passage of air through the solenoid valve from said cylinder to equalize the pressure on the brakes, retract the brakes to their normal position and again render operative the means for transmitting motion to said wheels, and means communicating through said valve between said cylinder and the outside atmosphere which is opened by manually setting said resettable switch.

References Cited in the file of this patent
UNITED STATES PATENTS

| Number | Name | Date |
| --- | --- | --- |
| 1,403,290 | Catching | Jan. 10, 1922 |
| 1,533,128 | Meyers | Apr. 14, 1925 |
| 1,846,032 | Hart | Feb. 23, 1932 |
| 1,848,903 | Peiffer et al. | Mar. 8, 1932 |
| 2,152,123 | Williams | Mar. 28, 1939 |
| 2,188,293 | Williams | Jan. 23, 1940 |
| 2,208,016 | Cowles | July 16, 1940 |
| 2,269,016 | Gille | Jan. 6, 1942 |
| 2,436,992 | Ernst | Mar. 2, 1948 |